Figure 1:
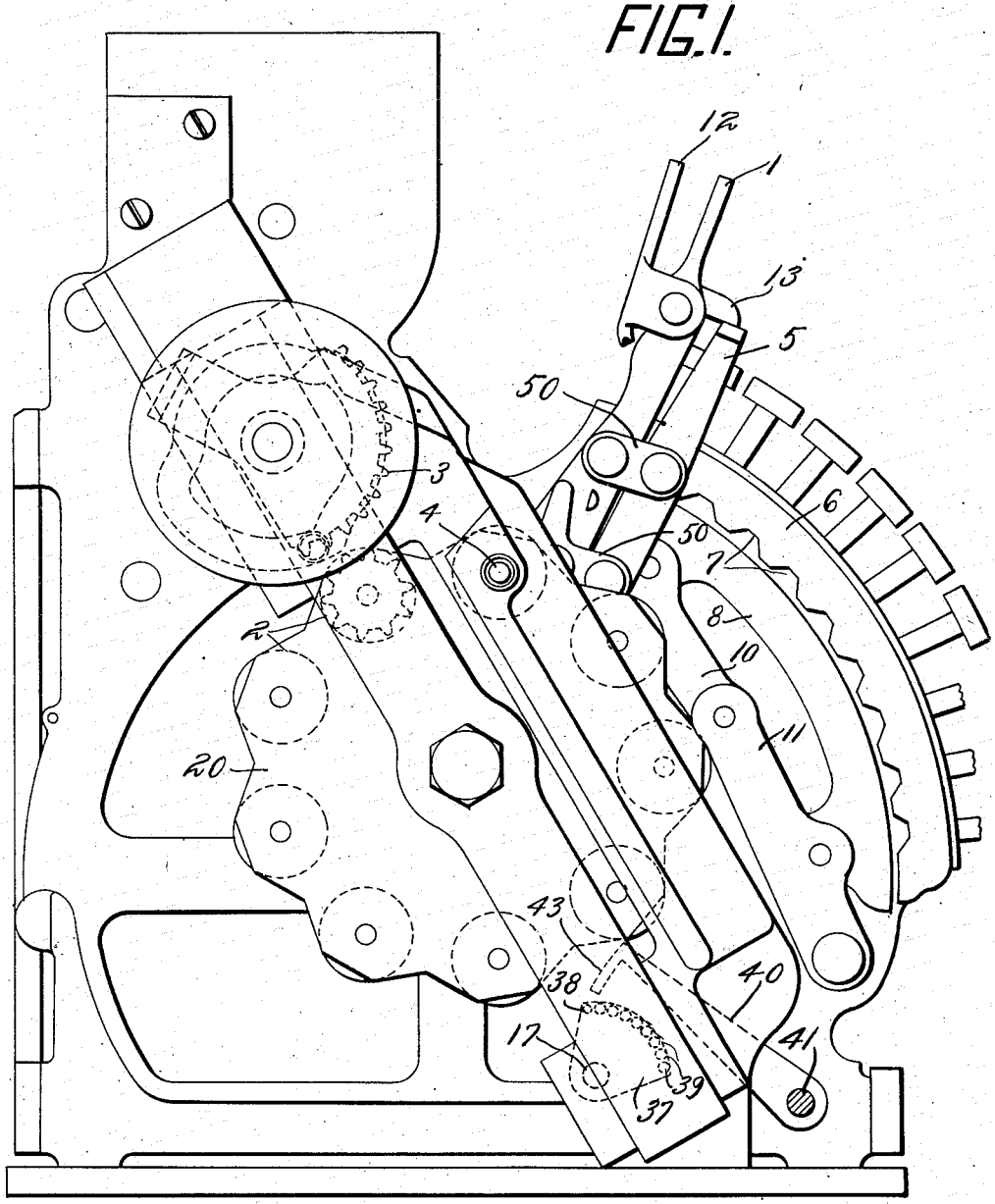

E. M. BATES & F. PHILLIPS.
REGISTER CONCEALING MECHANISM.
APPLICATION FILED APR. 23, 1913.

1,135,149.

Patented Apr. 13, 1915.
3 SHEETS—SHEET 2.

Witnesses
H. F. Sadgebury
E. R. Givin

Inventors
Ernest Montague Bates
and Frederick Phillips
by
Chester H. Braselton
Attorneys

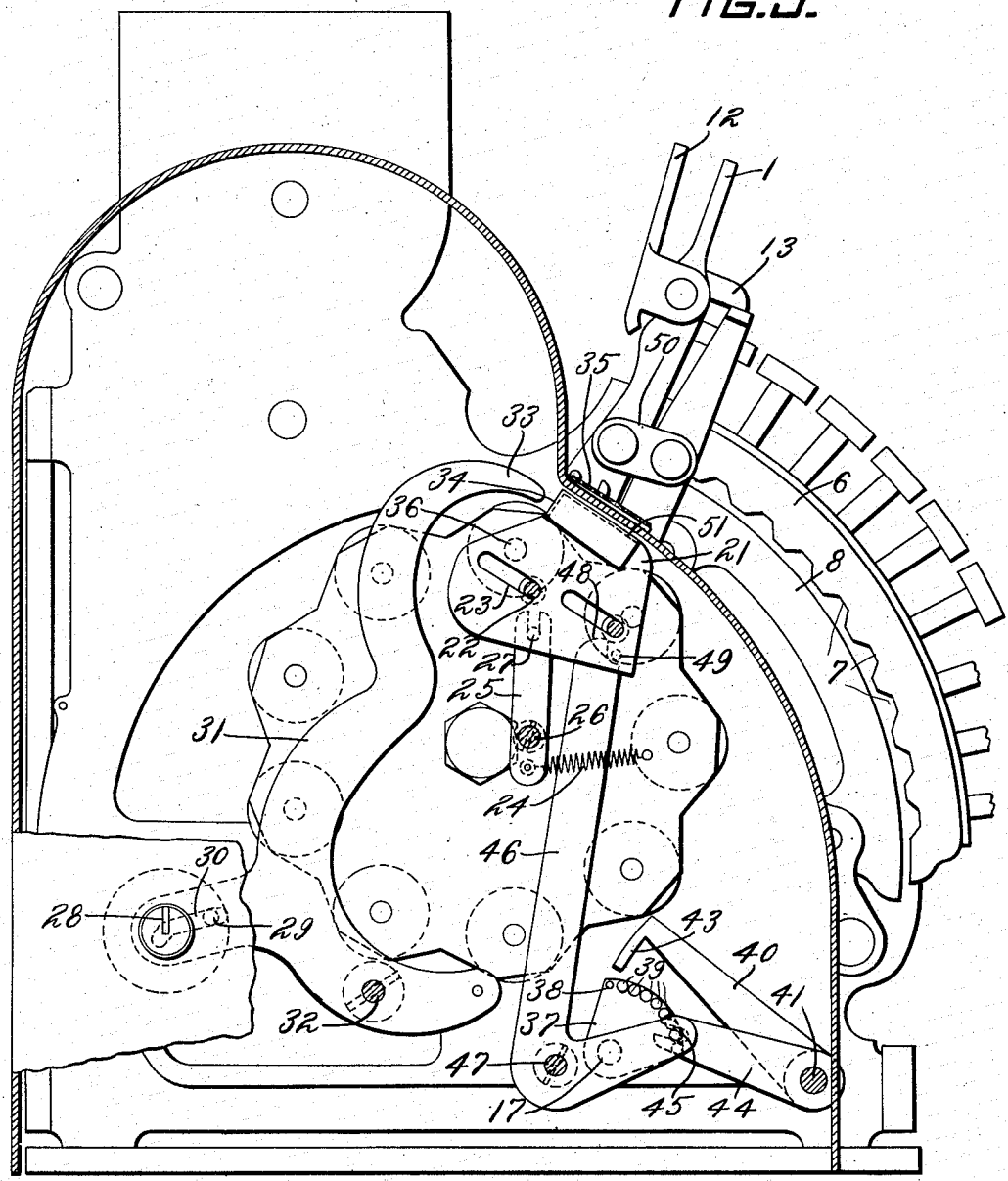

UNITED STATES PATENT OFFICE.

ERNEST MONTAGUE BATES AND FREDERICK PHILLIPS, OF LONDON, ENGLAND, ASSIGNORS TO THE NATIONAL CASH REGISTER COMPANY, OF DAYTON, OHIO, A CORPORATION OF OHIO, (INCORPORATED IN 1906.)

REGISTER-CONCEALING MECHANISM.

1,135,149.   Specification of Letters Patent.   Patented Apr. 13, 1915.

Application filed April 23, 1913. Serial No. 762,980.

*To all whom it may concern:*

Be it known that we, ERNEST MONTAGUE BATES and FREDERICK PHILLIPS, subjects of the King of Great Britain and Ireland, residing at London, England, have invented certain new and useful Improvements in Register-Concealing Mechanism, of which we declare the following to be a full, clear, and exact description.

This invention relates to machines or devices having a plurality of divisions or devices that can be selectively brought into a position in which they can be referred to and in which provisions are made for preventing free access to certain divisions or devices. It has particular application to account handling devices, such as credit cabinets, cash registers or other accounting machines, and in connection with accounting machines it is especially applicable to those of the type provided with multiple totalizers and means for bringing any desired totalizer into operative relation with the totalizer actuators or to a reading or a resetting position.

In using multiple totalizer registers it is in many cases desirable to permit free access for all of the users of the machines to certain totalizers for both adding and reading or reading and resetting operations, yet permit free use of others of the totalizers for adding operations only and this invention as specifically described relates to mechanism so controlling free reference to all the totalizers. In the form shown this is accomplished by means whereby the totalizer selecting device determines whether or not a totalizer can be referred to, and the totalizers are provided with concealing means adapted to be controlled by the operation of selecting the totalizer and in such a way that upon the selection of certain totalizers the latter will not be concealed, but upon selection of others the concealing means will be effective. In the form shown the selection of the totalizer also controls means the condition of which determines whether or not the totalizer selected can be returned to zero. In accounting machines adapted to print totals instead of having them read off from characters on the totalizer wheels, for the concealing means shown herein there would be substituted a provision whereby upon the selection of certain totalizers their totals could be printed but upon the selection of others the totals could not be printed.

In the drawings and descriptions given below the invention is shown applied to a multiple totalizer cash register of the type described in United States Letters Patent 703,639, granted July 1, 1902, to Thomas Carroll. The reason for this is that such a register is thought to be best adapted to use in illustrating and explaining the invention. However, while the invention has been disclosed in connection with the application of it to cash registers, it is not the intention to limit its use to such machines. It can be applied in various forms to other accounting machines or devices when it is desirable for the attendant to have access to a part of the records contained therein, but leaving the others normally inaccessible to him.

A main object of this invention is therefore, to make it possible for the operator of a cash register, accounting machine or other device having a plurality of manipulatively controlled totalizers or corresponding record retaining devices or divisions, to be able to refer to or gain access to certain ones of them, but not to the others, without interfering with means provided to enable the proprietor or person in charge to gain access to all of them.

Referring to the application of the invention to cash registers it may be mentioned that in many cases where multiple totalizer cash registers are used one of the totalizers is adapted to be used as an adding machine. For instance, in an office the accountant will use this particular totalizer to add a number of items, or, in a store where a refund or a discount is allowed on cash purchases, this totalizer is used to total the receipts or sales slips returned to determine the amount on which the discount is to be allowed. This makes a convenient way of quickly ascertaining the correct total of a number of items, particularly where, as is often the case, the register is electrically operated. However, this totalizer is simply a convenience, not a secret record, and there is no reason why the operator should not have access to it at any time.

As such machines are constructed now, it is impossible for the operator to gain access to this totalizer without also having access to all of the other totalizers. They are usually all contained in the same compartment of the machine and have one common position where the totals are read and the totalizer wheels reset to zero. The reading and resetting openings for the totalizers are normally closed by a movable slide which is moved away from the openings by the operation of a lock controlling the slide operating mechanism. Operating this lock makes it possible to read any of the totalizers that are brought to the reading opening and also makes it possible to reset any or all of them to zero. In other words turning the key in the lock operates mechanism to uncover the reading opening and the opening through which the resetting key is inserted, and the operator could, therefore, read and reset any or all of the totalizers. This condition detracts from the value of the totalizer as an adding machine because of the opportunity it gives for altering the records on the other totalizers either intentionally or through error, and because of the inconvenience. The key to the lock is usually held by the proprietor or manager and it is necessary to get the key from him or have him unlock the slide so that the total can be read. Where the totalizer is used this way a number of times during the day this becomes a source of considerable annoyance.

In order to make it possible to read the total on one totalizer of such types of machines and then reset it to zero without its being possible to read or disturb the other totalizers, this invention provides mechanism working independently of the regular slide operating mechanism. By manipulating this independent device the shield over the reading and resetting openings can be drawn out of the way when this one totalizer only is at reading position, making it possible to read and reset this totalizer without being able to in any way interfere with or read the other totalizers. This removes all inconvenience on account of having to operate the lock and all possibility of resetting the wrong totalizer either intentionally or through mistake.

With this and incidental objects in view, the invention consists in certain novel features of construction and combination of parts, the essential elements of which are set forth in appended claims, and a preferred form of embodiment of which is hereinafter described with reference to the drawings which accompany and form part of the specification.

Figure 2:
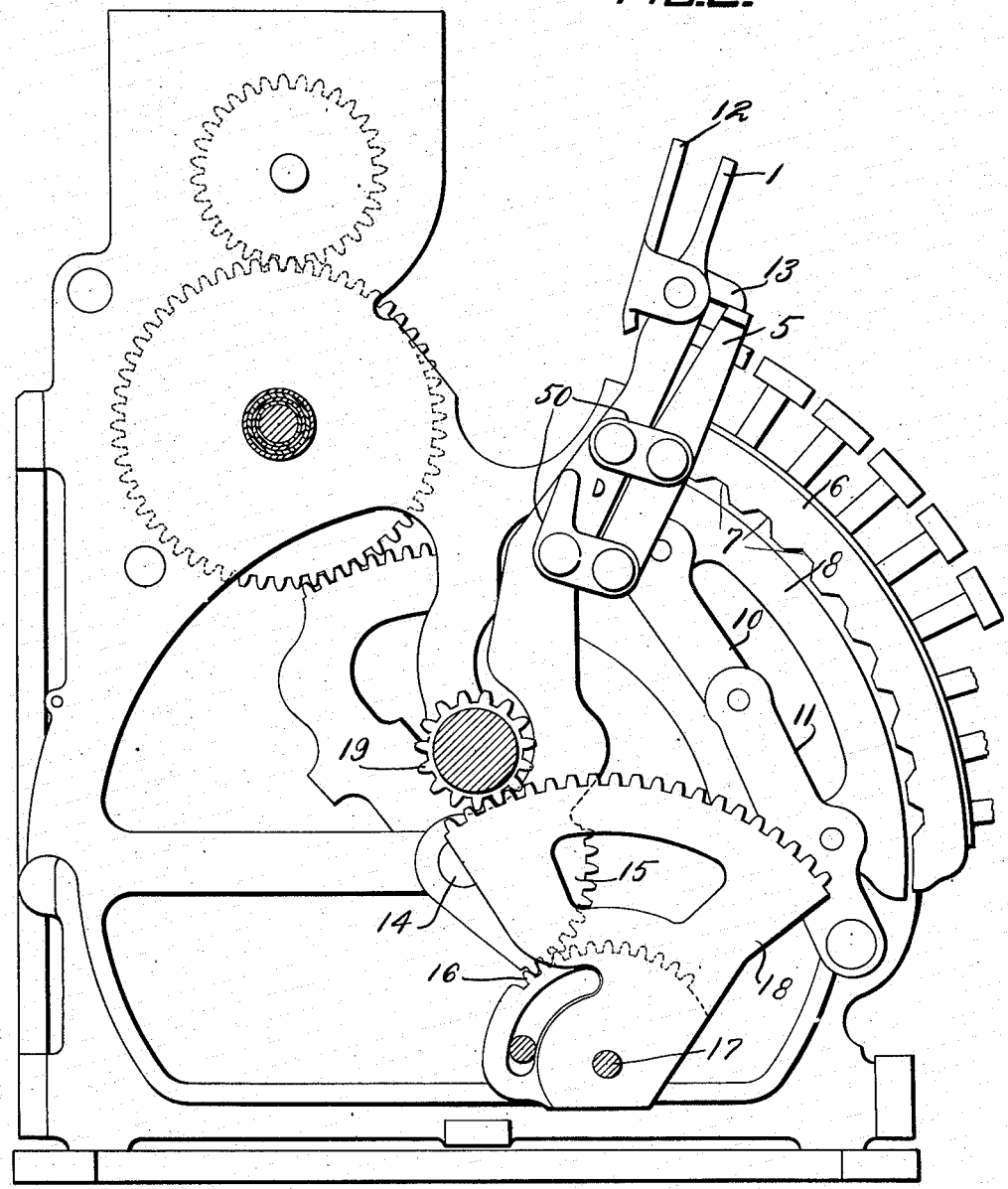

Figure 1 is a left side elevation of a multiple totalizer cash register with part of the improvement assembled therein. Fig. 2 shows the totalizer positioning mechanism. Fig. 3 is a left side elevation of a multiple totalizer register with the outside casing broken away and showing the parts of the improvement in their relative operating positions. Fig. 4 shows a handle by which the device is operated.

In these drawings there is shown a setting bar 1 for positioning the totalizers 2 in operative relation to their actuators 3 or opposite the opening 4 through which the resetting wrench is inserted to turn the totalizer wheels back to the zero position. When a totalizer is placed so that it is opposite the resetting opening 4 it is also said to be in the reading position, that is, the resetting and reading positions are the same. The setting bar 1 is alined by the plunger 5 which co-acts with a plate 6, suitably curved for the purpose and having notches 7 in which a block (not shown) on the side of the plunger 5 engages. This plunger is held up in the notches by a curved plate 8 which is being forced up at all times through the tension of a spring (not shown) acting upon the links 10 and 11 to which the plate 8 is loosely attached. In operating this mechanism the thumb lever 12 is pressed toward the bar 1 on which it is pivotally mounted, forcing the extension 13 down against the end of the plunger 5, which is also assembled to the bar 1 by the links 50. This forces the plunger 5 down so that the block above mentioned is out of engagement with the notches 7 leaving the bar 1 free to move. This bar is pivoted at 14 (Fig. 2) and carries at the lower end a segment gear 15 which is always in mesh with a segment gear 16 fastened to the shaft 17. As the bar 1 is moved up and down the shaft 17 is rocked about 90 degrees carrying with it segment gear 18 which is also attached to said shaft. This segment gear 18 in turn rotates a pinion 19 which is attached to and concentric with the reel 20 (Fig. 1) for carrying the totalizers. It will be seen therefore that movement of the bar 1 will, through the intervening parts, rotate the reel on its axis thereby making it possible to bring any desired totalizer to either the actuating or the reading position.

The reading opening is normally obscured by a shield indicated in Fig. 3 by the dotted line 51, attached to the movable bracket slide 21 and extending laterally of the machine under the opening 35. This slide 21 is movably supported by rivets 22 attached to the outside casing of the machine and passing through slots 23 in the slide. Said slide is normally held in its rearmost position by a spring 24 acting upon a lever 25, pivotally mounted on a stud 26 and having a fork at the upper end engaging a pin 27 in the slide. When it is desired to move the slide forward the lock 28 is operated. A flange attached to the lock barrel carries a pin 29 engaging in a slot 30 in a lever 31. This lever is mounted on a pivot 32 and as the lock 28 is turned in an anti-clockwise direction the pin 29 acting in the slot 30 will oscillate the lever on its pivot and force the upper extension 33 of the lever against a plate 34 attached to the slide 21 and move said slide forward against the tension of spring 24. This forward movement of the slide will carry the shield 51 attached thereto from under the reading opening 35, and at the same time expose the opening 4 (Fig. 1) in the totalizer supporting frame so that a resetting wrench can be inserted through said opening to engage the end of the totalizer shaft 36 of the positioned totalizer. The rotation of said shaft restores the totalizer wheels to zero in a manner well known in the art. After the totalizer has been read or turned to zero, or both, the lock 28 is turned in a clockwise direction and the slide 21 is returned to its normal position by the spring 24 acting through the connecting parts.

The mechanism so far described is the usual mechanism in a machine of the type specified. It has only been described in such detail because the parts covered by the invention are to supplement it and give results not possible with the former construction.

In a general way the device described in the application may be said to be an attachment for operating the slide 21 independently of the lock controlled device just described. It is, however, so arranged that only a certain totalizer or totalizers can be exposed through its use. It will be remembered that movement of bar 1 rocked shaft 17 and carried parts attached to it through an arc of about 90 degrees. Attached to this shaft is the part of the improvement which makes it possible to expose certain totalizers only, the others being wholly inaccessible except by operating the lock 28, the key to which is usually not in the possession of the accountant or clerk. This part consists specifically of a segment 37 (Fig. 3) with a number of holes 38 corresponding to the number of totalizers, in which holes are inserted pins 39. It is the omission of one of these pins that permits the device to expose the corresponding totalizer when it is at the reading or resetting position. Of course, the omission of more than one pin would make it possible to expose as many corresponding totalizers through the manipulation of the improved device and occasionally this might be necessary where such totalizers are so used that it would be desirable to have ready access to them without having to bother with the key.

The part working in direct connection with this segment and the pins therein is the arm 40 which is attached to the shaft 41. This shaft also has attached to it the operating handle 42 shown detached in Fig. 4, which extends out through the front casing of the machine. Lifting up the outer end 43 of this operating handle will rock the shaft 41 and the lever 40 in an anti-clockwise direction. If the totalizer reel is set with a totalizer at the reading position that this device is not intended to expose, the extension 43 of the lever 40 will strike one of the pins 39 and prevent the movement of the lever. If the reel is set with a totalizer at the reading position that is to be exposed by this device, there will be no pin in the corresponding hole of the segment 37 and the extension 43 of the lever 40 will carry down to the limit of the stroke of the lever. This will, as stated above, rock the shaft 41 and lever 40 anti-clockwise, and, because of the extension 43 being in the path of the pins 39, prevent movement of the lever 1 to bring another totalizer to the reading position until the handle 42 is returned to its normal position.

The rocking movement of shaft 41 is transmitted to an arm 44 fastened to the shaft which has a fork engaging a stud 45 in the bell crank lever 46. The anti-clockwise rotation of shaft 41 will, through the connecting parts, rock bell crank lever 46 in a clockwise direction on its pivot 47. A shoulder 48 on the upper arm of the bell crank lever engages a stud 49 in the slide 21 and, as the upper end of the bell crank lever is thrown forward, it pulls the slide 21 and the shield 51 carried thereby forward, uncovering the reading opening 35 and exposing the totalizer shaft 36 so that the totalizer may be turned to zero. When the totalizer has been read and reset to zero the parts are all returned to their normal positions by simply pushing down on the operating handle 43.

It will be seen that while this device is simple it accomplishes the results desired in a very satisfactory manner. In using a cash register of the type shown with it applied the clerk or accountant, when he has a number of items that he wishes to add up quickly and accurately, may set the proper totalizer at the adding position and record the various items. Then by the use of bar 1 he turns the totalizer to the reading position beneath the opening 35 and lifts up on the operating handle 42. There being no pin in the corresponding hole of segment 37, the mechanism operated by the handle will uncover the reading opening and the opening for turning the totalizer to zero. After noting the total shown by the totalizer wheels he can turn them back to zero and by pushing down on the operating handle 42 close the reading opening and the resetting hole. This in no way interferes with the regular lock controlled mechanism and the totalizers for which there are pins in the segment 37 can only be read or reset by getting possession of the lock key. Where it is desirable to have one or more of the totalizers accessible to the proprietor only and give the clerks or accountants free access to all the other totalizers this would, of course, be accomplished by omitting the pins from all of the holes in the segment 37 except those corresponding to the totalizers that are to be accessible to the proprietor only.

While the form of mechanism herein shown and described is admirably adapted to fulfil the objects primarily stated, it is to be understood that it is not intended to confine the invention to the one form of embodiment herein shown and described, as it is susceptible of embodiment in various forms, all coming within the scope of the claims which follow.

What is claimed is as follows:—

1. In a machine of the class described, the combination of a member having a plurality of divisions; means through which the divisions of the member are selectively accessible; mechanism for selecting said divisions; and devices, controlled by the selecting mechanism, for preventing access to certain divisions when they have been brought into accessible relationship with said means.

2. In a machine of the class described, the combination with an accounting machine having a plurality of totalizers; of manipulative devices for positioning said totalizers either in operative relation to their actuators or opposite a common reading opening; devices normally concealing said totalizers from view; independent manipulative devices for disabling said concealing means; and devices making one of said disabling devices operable only when a certain one of said totalizers is at the reading position, the other disabling means being operable when any one of the totalizers is at the reading position.

3. In a machine of the class described, the combination with a carrier containing a plurality of totalizers; of means for bringing any desired totalizer to a common reading position; means normally concealing said totalizers from view; a manipulative device for disabling said concealing means when certain totalizers are opposite the reading position; and devices for preventing the operation of said disabling means when others of the totalizers are opposite the reading position.

4. In a machine of the class described, the combination with a plurality of totalizers; of means for bringing any desired totalizer to a common reading position; means normally concealing said totalizers from view; and a manipulative device for disabling said concealing means when a certain one of said totalizers is opposite the reading position, said disabling device being rendered inoperable when others of said totalizers are in the reading position.

5. In a machine of the class described, the combination with a plurality of totalizers; a cover therefor having an opening common to all through which they may be selectively read; means normally concealing said totalizers from view; independent manipulative devices for disabling said concealing means and exposing the totalizers to view; and devices making one of said manipulative devices inoperable when certain totalizers are at the reading opening, the other of said devices being operable when any one of the totalizers is at the reading opening.

6. In a machine of the class described, the combination with a plurality of totalizers; of means for bringing any desired totalizer to a common reading position; a movable slide normally concealing said totalizers from view; and a manipulative device for operating said slide to expose the totalizers when certain of the totalizers are opposite the reading position, said manipulative device being inoperable when others of said totalizers are at the reading position.

7. In a machine of the class described, the combination with a plurality of totalizers; of means for bringing any desired totalizer to a common reading position; a movable slide normally concealing said totalizers from view; and two independent manipulative devices for operating said slide to expose to view the totalizer at the reading position, one of said devices being operable only when a certain totalizer is at the reading position and the other being operable when any one of the totalizers is at the reading position.

8. In a machine of the class described, the combination with a plurality of totalizers; of a shield normally concealing said totalizers from view; two independent manipulative devices for moving said shield and exposing the totalizers to view; another manipulative device for positioning any desired totalizer at a common reading opening; an element differentially moved by the operation of said positioning device and having manually adjustable means for controlling the operation of one of said shield moving devices; and an element co-acting with said differentially moved element to make one of the shield moving devices inoperable when any but certain desired totalizers are at the reading position.

9. In a machine of the class described, the combination with a plurality of totalizers; of a shield normally concealing said totalizers from view; two independent manipulative devices for moving said shield and exposing the totalizers to view, one of which is always operable; another manipulative device for positioning any desired totalizer at a common reading opening; a segment differentially moved by the operation of said positioning device and having removable pins for controlling the operation of the other of the aforesaid shield moving devices; and a member coöperating with said disk segment and the pins therein to make one of the shield moving devices inoperable when any but certain desired totalizers are at the reading position.

10. In a machine of the class described, the combination with a plurality of totalizers; of means normally concealing said totalizers from view; independent devices for disabling said concealing means; manipulative means for positioning any desired totalizer at a common reading opening; an element differentially moved by said manipulative positioning means; and an element co-acting with said differentially moved element to make one of the disabling devices inoperable when any but certain desired totalizers are at the reading opening.

11. In a machine of the class described, the combination with a reel; of a plurality of totalizers carried thereby; means for rotating said reel to bring any desired totalizer to a common reading position; means normally concealing said totalizers from view; a manipulative device for disabling said concealing means when a certain one of said totalizers is opposite the reading position; and means preventing adjustment of the reel to bring a different totalizer to the reading position while said disabling device is in operating position.

12. In a machine of the class described, the combination with a plurality of totalizers; of means for bringing any desired totalizer to a common reading position; means normally concealing said totalizers from view; independent manipulative devices for disabling said concealing means; and an element manually adjustable to make one of said disabling devices inoperable when certain totalizers are at the reading position, the other disabling device remaining operable when any one of the totalizers is at the reading position.

13. In a machine of the class described, the combination with a plurality of totalizers; of means for selectively bringing said totalizers to a position where the totals shown on them may be ascertained or destroyed or both; and means to prevent ascertaining or destroying the totals except those on certain desired totalizers when they are at said position.

14. In a machine of the class described, the combination with an accounting machine having a plurality of totalizers; of means for selectively positioning them so that the totals shown on them can be ascertained or destroyed or both; means normally preventing the ascertaining or destroying of the totals; and means to disable said preventing means when certain totalizers are at the position where the totals are ascertained and destroyed, said disabling means remaining effective when others of the accumulators are at said position.

15. In a machine of the class described, the combination with a plurality of totalizers; of devices for differentially moving said totalizers to a common position where the totals shown on them may be ascertained or destroyed or both; and manually adjustable means to prevent ascertaining or destroying said totals when certain of the totalizers are at the said common position.

16. In a machine of the class described, the combination with a plurality of totalizers; of means for selectively bringing said totalizers to a position where the totals shown on them may be ascertained or destroyed or both; means normally preventing the ascertaining or destroying of the totals; and independent devices for disabling said preventing means, one of which disabling devices is always operable and the other operable only when certain ones of the totalizers are at the position where the totals are ascertained and destroyed.

17. In a machine of the class described, the combination with a plurality of totalizers; of means for bringing any desired totalizer to a common reading position; means normally concealing said totalizers from view; and devices for disabling said concealing means when certain ones of said totalizers are at the reading position, the concealing means remaining effective when others of the totalizers are opposite the reading position.

18. In a machine of the class described, the combination with an accounting machine having a plurality of totalizers; of means for selectively positioning the totalizers so that the totals shown on them can be ascertained or destroyed or both; means normally preventing the ascertaining or destroying of the totals; means to disable said preventing means when certain totalizers are at the position where the totals are ascertained and destroyed; and means preventing the operation of said disabling means when others of the totalizers are at said position.

19. In a machine of the class described, the combination with a plurality of record retaining devices; of means normally concealing same; means for disabling said concealing means; means for selectively bringing said record retaining devices to a common position; and means making the aforesaid disabling means inoperable except when certain desired record retaining devices are at said common position.

20. In a machine of the class described, the combination of a member having a plurality of divisions; means through which the divisions of the member are selectively accessible; mechanism for selecting said divisions; and devices, controlled by the selecting mechanism, permitting access to certain divisions when they have been selected for access.

21. In a machine of the class described, the combination with a movable frame, of a plurality of totalizers carried thereby, means through which access may be had to the totalizers, an adjustable device for establishing accessible relationship between said means and any desired totalizer, and devices controlled by the adjustable device for preventing access to certain totalizers when they are in accessible relationship.

22. In a machine of the class described, the combination with a plurality of totalizers, of means normally rendering said totalizers inaccessible, a manipulative device operable to disable said means to render any of the totalizers accessible, and an independent manipulative device operable to disable said first mentioned means to render only a certain one of the totalizers accessible.

23. In a machine of the class described, the combination with a rotatable frame, of a plurality of totalizers carried thereby, a casing having an opening through which the totalizers may be read, a shield normally obscuring said opening, means for rotating the aforesaid totalizer frame to position any desired totalizer at the reading opening, independent manipulative devices for withdrawing the shield to expose the positioned totalizer, and devices rendering one of said manipulative devices ineffective to withdraw the shield when certain ones of the totalizers are at the reading opening, the other manipulative device being effective to withdraw the shield when any of the totalizers is at said opening.

In testimony whereof we affix our signatures in the presence of two witnesses.

ERNEST MONTAGUE BATES.
FREDERICK PHILLIPS.

Witnesses:
C. M. HUMBLE-CROFTS,
T. L. HOOPER.